United States Patent
Hemmer et al.

(10) Patent No.: US 10,659,789 B2
(45) Date of Patent: May 19, 2020

(54) ENCODING COST AWARE EDGE SELECTION FOR IMPROVED PROGRESSIVE MESH COMPRESSION

(71) Applicant: GOOGLE LLC, Mountain View, CA (US)

(72) Inventors: Michael Hemmer, San Francisco, CA (US); Pierre Alliez, Sophia Antipolis (FR); Cedric Portaneri, Sophia Antipolis (FR)

(73) Assignee: GOOGLE LLC, Mountain View, CA (US)

( * ) Notice: Subject to any disclaimer, the term of this patent is extended or adjusted under 35 U.S.C. 154(b) by 148 days.

(21) Appl. No.: 15/951,944

(22) Filed: Apr. 12, 2018

(65) Prior Publication Data

US 2019/0320183 A1   Oct. 17, 2019

(51) Int. Cl.
*H04N 19/14*   (2014.01)
*G06T 9/00*    (2006.01)
*H04N 19/65*   (2014.01)

(52) U.S. Cl.
CPC ............ *H04N 19/14* (2014.11); *G06T 9/001* (2013.01); *H04N 19/65* (2014.11)

(58) Field of Classification Search
CPC ... G06T 9/001; G06T 17/205; G06T 2210/36; H04N 19/14; H04N 19/65
USPC .................................................. 382/244, 232
See application file for complete search history.

(56) References Cited

U.S. PATENT DOCUMENTS

| | | | |
|---|---|---|---|
| 5,929,860 A * | 7/1999 | Hoppe | G06T 17/20 345/419 |
| 6,262,737 B1 * | 7/2001 | Li | G06T 17/20 345/419 |
| 6,614,428 B1 | 9/2003 | Lengyel et al. | |
| 7,283,134 B2 * | 10/2007 | Hoppe | G06T 17/20 345/419 |
| 2017/0046874 A1 | 2/2017 | Mason | |

FOREIGN PATENT DOCUMENTS

WO   9939308 A1   8/1999

OTHER PUBLICATIONS

Caillaud, et al. (Progressive compression of generic surface meshes, pp. 1-4. (Year: 2015).*

(Continued)

*Primary Examiner* — Daniel G Mariam
(74) *Attorney, Agent, or Firm* — Brake Hughes Bellermann LLP (57) ABSTRACT

An encoder includes a processor and a memory. The encoder may perform a method of progressive compression. In one example implementation, the method may include determining a priority value for each edge of a plurality of edges, the priority value of an edge of the plurality of edges determined based on an error metric value and an estimated encoding cost associated with the edge. The method may further include determining a set of edges for collapse, the set of edges determined from the plurality of edges based on the priority values and collapsing the set of edges and generating vertex split information. In some implementations, the method may include entropy encoding the vertex split information.

17 Claims, 6 Drawing Sheets

(56) References Cited

OTHER PUBLICATIONS

Guangming, et al. (A new mesh simplification algorithm combining half-edge data structure with modified quadratic error metric), pp. 1-4, IEEE. (Year: 2002).*

Peng, et al. (Technologies for 3D mesh compression: A survey), pp. 688-733, J. Vis. Communication, Image R. (Year: 2005).*

Adrien, et al. (POMAR: Compression of progressive oriented meshes accessible randomly), pp. 743-752, Computers and Graphics, vol. 37, No. 6. (Year: 2013).*

Caillaud, F. et al.: "Progressive Compression of Arbitrary Textured Meshes," Computer Graphics Forum (Proceedings of Pacific Graphics), vol. 35, No. 7. 2016, 10 pages.

Garland, M. et al.: "Surface Simplification Using Quadric Error Metrics," SIGGRAPH 97, 1997, 8 pages.

Hoppe, H.: "New Quadric Metric for Simplifying Meshes with Appearance Attributes," Proceedings of the conference on Visualization '99: celebrating ten years, San Francisco, California, USA, Oct. 1999, p. 59-66.

Pajarola, R. et al: "Compressed Progressive Meshes," IEEE Trans. Vis. Comput. Graph., 6 (1), 2000, pp. 79-93.

Al-Regib, Ghassan et al., "Bit Allocation for Joint Source and Channel Coding of Progressively Compressed 3-D Models", IEEE Transactions on Circuits and Systems for Video Technology, vol. 15, No. 2, pp. 256-268, Feb. 2005, XP011126455.

International Search Report and Written Opinion for International Application No. PCT/US2019/027037, dated Jun. 28, 2019, 16 pages.

International Search Report and Written Opinion for International Application No. PCT/US2019/027041, dated Jun. 28, 2019, 15 pages.

International Search Report and Written Opinion for International Application No. PCT/US2019/027042, dated Jun. 28, 2019, 15 pages.

Karni, Zachi et al., "Efficient Compression and Rendering of Multi-Resolution Meshes", IEEE Visualization 2002, pp. 347-354, Oct. 2002, XP031173386.

Liu, Xingguo et al., "Progressive Geometry Compression for Meshes", IEEE Computer Graphics and Applications, pp. 408-410, Oct. 3, 2000, XP010523038.

Maglo, Adrien et al., "POMAR: Compression of progressive oriented meshes accessible randomly", Computers and graphics, vol. 37, No. 6, pp. 743-752, Oct. 2013, XP055596461.

Park, Sung-Bum et al., "Progressive Mesh Compression Using Cosine Index Predictor and 2-Stage Geometry Predictor", IEEE International Conference on Image Processing, vol. 2, pp. 233-236, Sep. 22, 2002, XP010607951.

Hoppe, "Progressive Meshes", Proceedings of the 23rd Annual Conference on Computer Graphics and Interactive Techniques (SIGGRAPH '96), 1996, pp. 99-108.

\* cited by examiner

Determine, by an encoder, a priority value for each edge of a plurality of edges, the priority value of an edge of the plurality of edges determined based on an error metric value and an estimated encoding cost associated with the edge 510

↓

Determine, by the encoder, a set of edges for collapse, from the plurality of edges, based on the priority values 520

↓

Collapse, by the encoder, the set of edges and generate vertex split information 530

↓

Entropy encode, by the encoder, the vertex split information 540

ENCODING COST AWARE EDGE SELECTION FOR IMPROVED PROGRESSIVE MESH COMPRESSION

CROSS REFERENCE TO RELATED APPLICATIONS

This application is related to applications Ser. Nos. 15/951,963 and 15/951,969, filed on Apr. 12, 2018, the disclosures of both the applications are incorporated by reference herein in their entirety.

FIELD

This application relates, generally, to mesh compression, and specifically, to progressive mesh compression.

BACKGROUND

Progressive mesh compression (or progressive compression) is the encoding of mesh geometry in stages with each stage generating information related to mesh connectivity, positions, and other attributes. Each successive stage results in a coarser level of detail (LOD) of the model, and the encoding of the next LOD takes advantage of the information already contained in the previous LOD. This is relevant for transmitting high resolution models via the Internet as the user on the receiving end (e.g., a client, a client device, or an application) does not have to wait until the entire model is received from the server. The client can quickly display lower resolution LODs of the model before the information associated with higher resolution LODs is received at the client device.

SUMMARY

In one aspect, a method includes a computer-implemented method of progressive mesh compression. In one example implementation, the method may include determining a priority value for each edge of a plurality of edges, the priority value of an edge of the plurality of edges determined based on an error metric value and an estimated encoding cost associated with the edge, determining a set of edges for collapse, the set of edges determined from the plurality of edges based on the priority values, and collapsing the set of edges and generating vertex split information. In some implementations, the method may further include entropy encoding the vertex split information.

In another aspect, an encoder includes a processor and a memory. The memory may include instructions configured to cause the processor to determine a priority value for each edge of a plurality of edges, the priority value of an edge of the plurality of edges determined based on an error metric value and an estimated encoding cost associated with the edge, determine a set of edges for collapse, the set of edges determined from the plurality of edges based on the priority values, and collapse the set of edges and generate vertex split information. In some implementations, the memory may further include instructions to cause the processor to entropy encode the vertex split information.

In a further additional aspect, a non-transitory computer-readable storage medium having stored thereon computer executable program code which, when executed on a computer system, causes the computer system to perform a method of progressive mesh compression. The method may include determining a priority value for each edge of a plurality of edges, the priority value of an edge of the plurality of edges determined based on an error metric value and an estimated encoding cost associated with the edge, determining a set of edges for collapse, the set of edges determined from the plurality of edges based on the priority values, and collapsing the set of edges and generating vertex split information. In some implementations, the method may further include entropy encoding the vertex split information.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

It should be noted that these Figures are intended to illustrate the general characteristics of methods, structure, or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementation. The use of similar or identical reference numbers in the various drawings is intended to indicate the presence of a similar or identical element or feature.

DETAILED DESCRIPTION

In one implementation, an encoder may determine a priority value for each edge of a plurality of edges, the priority value of an edge of the plurality of edges determined based on an error metric value and an estimated encoding cost associated with the edge. The encoder may further determine a set of edges for collapse, the set of edges determined from the plurality of edges based on the priority values, and collapse the set of edges and generate vertex split information. In some implementation, the encoder may entropy encode the vertex split information.

Figure 1A:
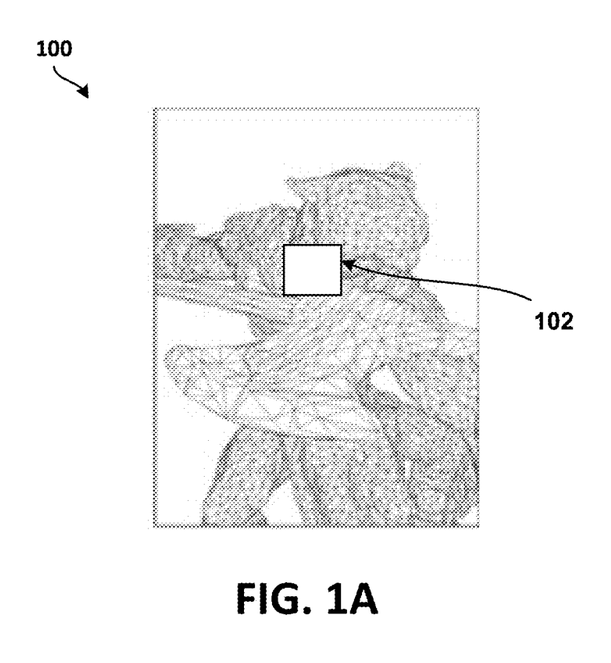
FIG. 1A illustrates a portion of a geometric model (or an image of a geometric model) being compressed using an edge collapse operation, according to at least one example implementation.

FIG. 1A illustrates a portion of a geometric model 100 being compressed using an edge collapse operation, according to at least one example implementation. In FIG. 1A, area 102 of the geometric model 100 represents an area which may be compressed using improved progressive mesh compression. In one example implementation, the area 102 may be compressed using a full-edge collapse operation (or using a full-edge collapse operator) that is described in detail below in reference to FIG. 2A. During progressive mesh compression, an encoder may generate a plurality of LODs and associated vertex split records. A LOD and associated vertex split records may be generated by collapsing an input mesh with successive batches (e.g. one or more batches) of edge collapse operators until a very coarse mesh is generated or there are no more edges for collapse (e.g., error metric value may be too high for the LOD for edge collapse).

Figure 1B:
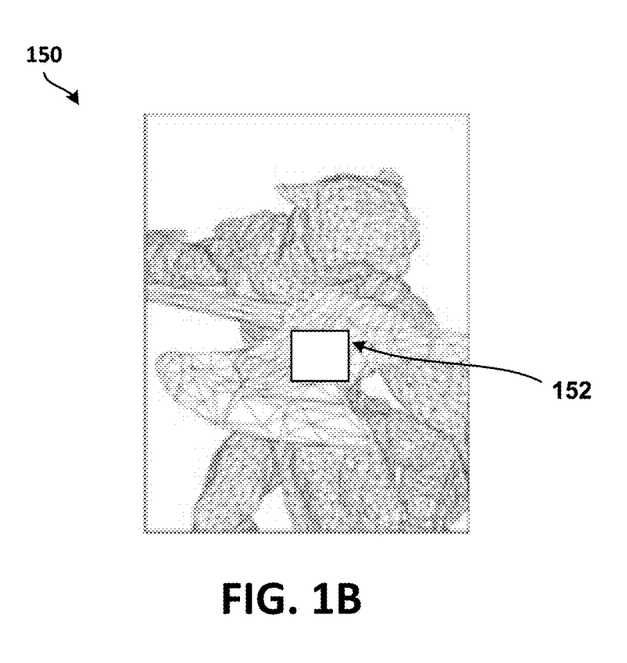
FIG. 1B illustrates a portion of a geometric model (or an image of a geometric model) being compressed using another edge collapse operation, according to at least another example implementation.

FIG. 1B illustrates a portion of a geometric model 150 being compressed using another edge collapse operation, according to at least one example implementation. In FIG. 1B, area 152 of the geometric model 150 represents an area which may be compressed using improved progressive mesh compression. In one example implementation, the area 152 may be compressed using a half-edge collapse operation (or using a half-edge collapse operator) that is described in detail below in reference to FIG. 2B.

Figure 2A:
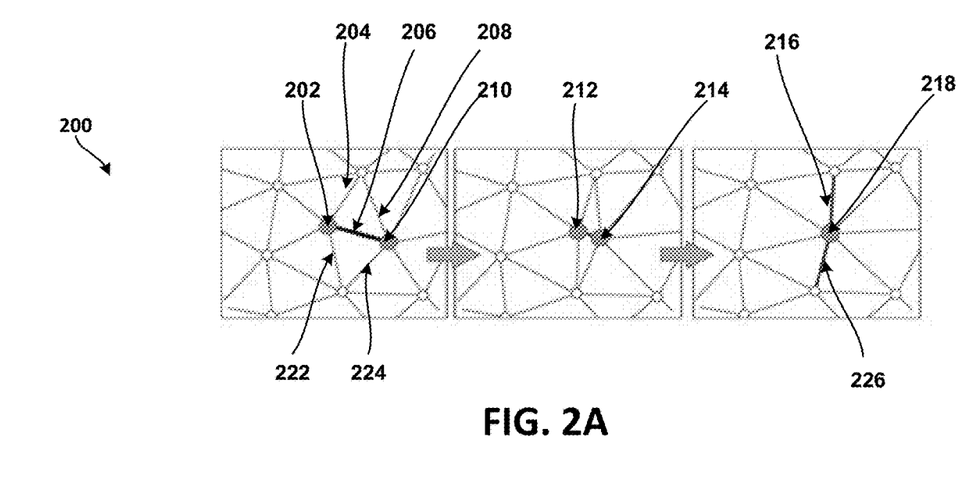
FIG. 2A illustrates a full-edge collapse operation, according to at least one example implementation.

FIG. 2A illustrates a full-edge collapse operation 200, according to at least one example implementation.

In FIG. 2A, an edge 206 connecting vertices 202, 210 may be collapsed via a full-edge collapse operation (e.g., using a full-edge collapse operator). In such a full-edge collapse operation, the two vertices 202, 210 are merged into one vertex (e.g., a merged vertex, a split vertex, etc.) and a new vertex 218 is generated. The location of the new vertex 218 may be determined based on, for example, minimizing an error associated with the collapse of the edge 206 (e.g., minimizing the associated local error).

The full-edge collapse operation requires higher number of bits (for instance, when compared to the half-edge collapse operation described below in reference to FIG. 2B) for encoding the two residuals between the merged vertex 218 and its two ancestors 202, 210 so that a decoder can properly reverse the full-edge collapse operation during decoding. During the full-edge collapse operation, as the edge 206 is being collapsed, the edges 204 and 208 are collapsed into a new edge (e.g., edge 216) and edges 222 and 224 are collapsed into another new edge (e.g., edge 226). Vertices 212 and 214 illustrate the merging of vertices 202 and 204 during transition of the full-edge operation. The collapsing of an edge (e.g., using a full-edge collapse operation) and the merging of the vertices, as described above, may generate a LOD (e.g., lower LOD) and associated vertex split records. The vertex split records are used by the decoder to decode (e.g., re-construct) the vertices and/or the edges that were encoded (e.g., collapsed, merged, etc.) during the full-edge collapse operation.

Figure 2B:
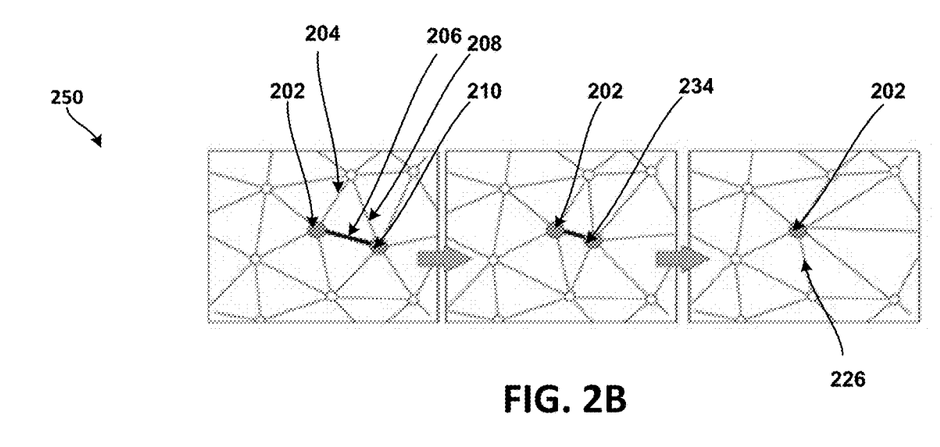
FIG. 2B illustrates a half-edge collapse operation, according to at least one example implementation.

FIG. 2B illustrates a half-edge collapse operation 250, according to at least one example implementation.

In FIG. 2B, the edge 206 connecting vertices 202, 210 may be collapsed via a half-edge collapse operation (e.g., using a half-edge collapse operator). In such a half-edge collapse operation, one of the two vertices (e.g., vertex 210) may be merged into another vertex (e.g., vertex 202), and data is generated so that the decoder may regenerate the vertices or edges during decoding.

The half-edge collapse operation requires a lower number of bits (for instance, when compared to the full-edge collapse operation described above in reference to FIG. 2A) as only one residual associated with the vertex that is merged (e.g., vertex 210) has to be encoded to reverse the half-edge collapse operation during decoding. During the half-edge collapse operation, as the vertex 210 is being merged into vertex 202, the edge 208 is collapsed into the edge 204 and the edge 224 is collapsed into edge 222. Vertex 234 illustrates the merging of the vertex 210 into the vertex 202 during transition of the half-edge collapse operation. The collapsing or merging of edges and/or merging of vertices using half-edge collapse operations, as described above, may generate a LOD (e.g., lower LOD) and associated vertex split records. The vertex split records are used by the decoder to decode (e.g., re-construct) the vertices and/or the edges that were encoded (e.g., collapsed, merged, etc.) during the half-edge collapse operation. Although, the half-edge collapse operation may require lower number of bits (for instance, when compared to full-edge collapse operation) for representing the information that is required for decoding, the distortion rate may be higher (e.g., more distorted lower LODs).

Figure 3A:
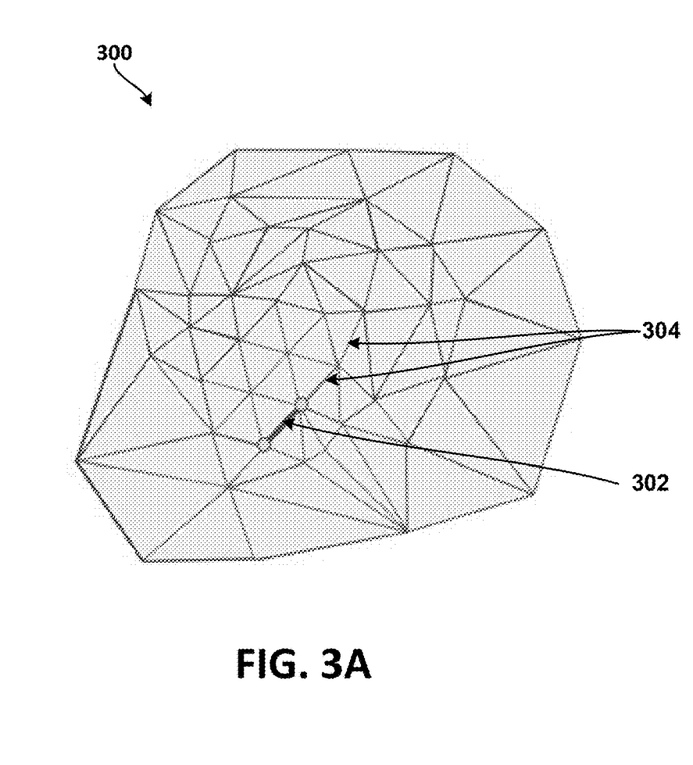
FIG. 3A illustrates progressive compression (progressive compression mechanism), according to at least one example implementation.
Figure 3B:
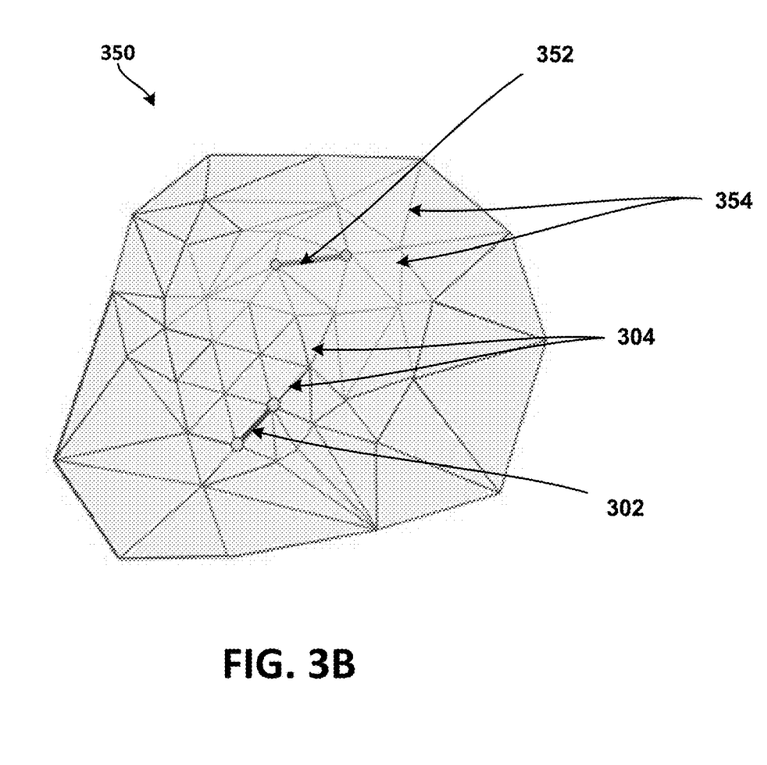
FIG. 3B illustrates progressive compression, according to at least another example implementation.

FIG. 3A illustrates progressive compression mechanism 300, according to at least one example implementation. FIG. 3B illustrates progressive compression mechanism 350, according to at least another example implementation.

A sequence of levels of detail (LODs) may be created (or generated) during progressive compression by decimating an input mesh with successive batches of edge collapses (for example, using edge collapse operators) until a very coarse mesh is generated (or no more edges are available for collapse as error metric values may be too high for the LOD for edge collapses). A batch of edge collapses may include collapsing a subset of edges of a current mesh.

During progressive mesh compression, edges must form an independent set of edges so that they could be collapsed without interference from (or being blocked by) other edges in the immediate neighborhood (e.g., vicinity). A set of edges may be defined as an independent set of edges if the set of edges are sufficiently separated from each other such that each edge of the set of edges may be collapsed without being interfered. For example, in FIG. 3A, an edge 302, which may be a part of independent set of edges, may be collapsed without interference from other edges (e.g., edges 304) in the vicinity. However, the edges 304 which are in the vicinity of the edge 302 may be blocked from being collapsed by the edge 302. The edges 304 that are being blocked (e.g., from being collapsed) by another edge (e.g., edge 302) are generally referred to as blocked edges and cannot be collapsed in the current round (e.g., while generating the current LOD). That is, the edges 304 cannot be collapsed in the same round as the edge 302. However, one or more of the edges 304 may become part of another independent set of edges during a later round of edge collapses to generate another LOD.

Similarly, in FIG. 3B, in addition to the edge 302, edge 352, may be a part of the independent set of edges and may be collapsed without interference from other edges (e.g., 354 or 304) in the vicinity of the edge 352. However, the edges 354 which are in the vicinity of the edge 352 may be blocked from being collapsed by the edge 352. The edges 354 that are blocked (e.g., from being collapsed) by another edge (e.g., edge 352) are referred to as blocked edges and cannot be collapsed in the current round (e.g., while generating the current LOD). That is, the edges 354 cannot be collapsed in the same round as the edge 352. However, one or more of the edges 354 may become part of another independent set of edges during a later round of edge collapses to generate another LOD.

In some implementations, for example, the edges 302 and 352 may be collapsed using full-edge collapse operations (e.g., described above in detail in reference to FIG. 2A) or half-edge collapse operations (e.g., described above in detail in reference to FIG. 2B). In some other implementations, one LOD may be generated using one type of edge-collapse operations (e.g., half-edge or full-edge collapse operations) and/or the following LOD may be generated using another type of edge-collapse operations (e.g. full-edge or half-edge collapse operators) to achieve a balance between quality (e.g., distortion) and cost (e.g., bit rate or bits per vertex).

In progressive mesh compression, each edge collapse may be associated with an error (e.g., an error metric value) when the edge is collapsed. The error metric value reflects (e.g., represents) the affect of the edge collapse on the quality of the mesh. In other words, the error metric value associated with an edge collapse indicates how the quality of the mesh may be (e.g., negatively) impacted by the collapse of the edge. Therefore, to avoid collapsing edges that are too expensive (e.g., major affect on the quality of the mesh, etc.), the edges may be sorted (e.g., prioritized) based on their associated error metric values prior to being selected for collapse (or prior to being added to an independent set of edges). For example, the edges may be sorted based on their error metric values and the edge with the lowest associated error metric value queued first. In one example implementation, as the edges of the input mesh are being selected, the edges that are not being blocked are added to form (or create) an independent set of edges (e.g., first independent set of edges) and edges in the vicinity of an edge that may be blocked are not considered for collapse in the current round. The adding of edges to the independent set of edges may continue until all edges are blocked or error metric values are above a corresponding threshold.

As a batch of edges is collapsed, a lower LOD (e.g., lower resolution or coarser LOD) is generated along with additional information (e.g., vertex split information) that allows the decoder to recover the previous LOD (e.g. higher resolution LOD). In some implementation, the information generated during the generating of a LOD may include, for example, a header with initial information for the decoder (e.g., indicating whether full-edge or half-edge operations were performed); information on how the encoded vertices are to be split into edges at the decoder; information how the vertices (e.g., split vertices) are connected to their surrounding vertices (neighbors of the split vertex); information necessary for the recovery of positions of the split vertices; and/or texture coordinates or any other optional attributes.

In some implementations, for example, an independent set of edges for collapse may be determined by adding next best edges that are not blocked based on error metric values (e.g., quadric error metric values, Hausdorff distance values, etc.) associated with the edges. However, this may not be the most efficient method as the error metric values do not take into consideration the residuals (or residual values) or encoding costs associated with edge collapses. Therefore, the proposed encoding cost aware edge selection for improved progressive mesh compression describes an approach where the independent set of edges (e.g., for a LOD) may be determined based on priority values assigned to each edge of a plurality of edges of a mesh. In some implementations, the priority value of an edge may be determined based on, for example, an error metric value and an estimated encoding cost associated with the edge. For example, when two near-by edges have relatively similar (e.g., close) error metric values, the proposed encoding cost aware edge selection mechanism takes into consideration their associated encoding costs as well to select the edges. That is, a combination of the error metric value and residual values may be compared to select the better edge as the selected edge may provide for better compression rates, for example, during the entropy encoding of the residual values.

In one implementation, for example, an encoder may determine an error metric value associated with collapse of each edge of the plurality of edges, determine the estimated encoding cost associated with collapse of each edge of the plurality of edges, determine a priority value for each edge of a plurality of edges, the priority value of an edge of the plurality of edges determined based on an error metric value and an estimated encoding cost associated with the edge, determine a set of edges, from the plurality of edges, for collapse based on the priority values, collapse the set of edges and generate vertex split information, and transmit the generated vertex split information in response to a message received from a decoder. In some implementations, the encoder may entropy encode the vertex split information prior to being transmitted.

Figure 4A:
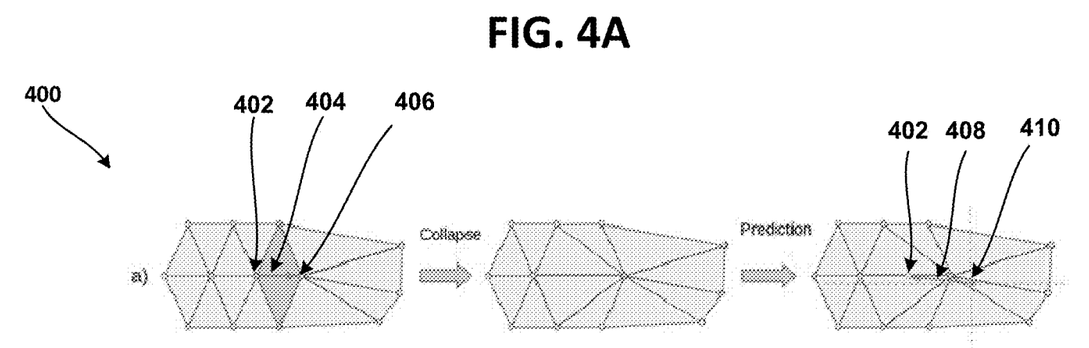
FIG. 4A illustrates an edge selection for progressive compression, according to at least one example implementation.

FIG. 4A illustrates an edge selection mechanism 400 for progressive mesh compression, according to at least one example implementation.

In FIG. 4A, an edge 404 connecting two vertices 402, 406 may be collapsed using an edge collapse operation. In one implementation, for example, the edge-collapse operation may be a half-edge collapse operation. That is, the vertex 402 is merged with the vertex 406 during the collapse of the edge 404. The decoder, upon receiving the encoded information from the encoder, decodes the encoded information to determine the location of the vertices and tries to re-construct the edges. For example, in one implementation, the decoder may determine that the estimated location of the vertex 402 is at a location 410. However, to maintain the quality of the LOD, the encoder has to encode the residual 408 (e.g., residual vector 408) so that the decoder may use the residual 408 to correct the location of the vertex 402 to its actual location. The residual 408 may be determined based on a length of the residual vector (e.g., difference in length between 402 and 410). However, since the length of the residual vector is relatively relative longer (e.g., higher residual values), the overall cost of encoding the vertex split information increases and/or the selection of the edge 404 for collapse may not be the optimal choice. Therefore, the present disclosure describes an encoding cost aware edge selection for improved progressive mesh compression.

Figure 4B:
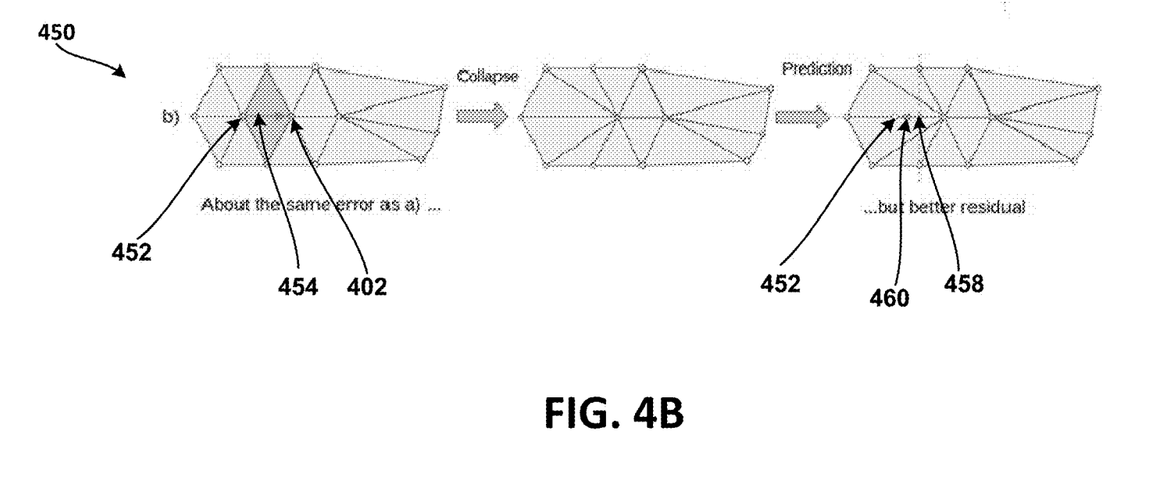
FIG. 4B illustrates an encoding cost aware edge selection for improved progressive compression, according to at least one example implementation.

FIG. 4B illustrates an encoding cost aware edge selection 450 for improved progressive mesh compression, according to at least one example implementation.

In FIG. 4B, instead of selecting edge 404 for collapse, the encoder may select edge 454 connecting vertices 452 and 402 for collapse. In one implementation, for example, the edge 454 may be collapsed using a half-edge collapse operation. The selection of the edge 454 (instead of the edge 404) may be based on a higher priority value being assigned to the edge 454, the higher priority value may be assigned to the edge 454 based on the edge 454 having better residual values than the edge 404 as described below. In some implementations, this may be achieved as the encoder has knowledge of what the decoder may do and the encoder has all the information the decoder may use. The encoder may simulate the predicted location of the vertex (e.g., 458) and the associated residuals (e.g., 460), and may save the residual values for transmitting to the decoder.

In one implementation, the encoder may determine the residual associated with an edge collapse. The encoder may predict the location of the vertex 452 would be at 458. This may require the encoder transmitting (and entropy encoding prior to transmitting) a residual 460. The value of the residual 460 is much smaller (for example, based on a length of the residual vector) than the length of residual 408 of FIG. 4A. This may result in the encoder transmitting less information related to the residual (when compared to the residual 408). That is, the estimated encoding cost of the residual may be based on the length of the residual vector, the length of the residual vector being shorter than the residual vector 408. The above described procedure may help with entropy decoding of the residuals (e.g., vertex split information) as the residuals may have values of zero or closer to zero. For example, the residuals values may be, for instance, −2, −1, 0, +1, +2, etc. providing for better entropy encoding and better compression rates. In other words, the encoder may consider error metric values and encoding cost of edges for determining the priority values resulting in better entropy encoding and/or better compression rates.

In some implementations, the above described mechanism modifies the priority values of the edges that are closer in error metric values by relying on encoding costs (e.g., residuals). For instance, an edge that would be ranked lower based on priority values using just error metric values when compared to another neighbor edge may be ranked higher if the edges are ranked based on priority values using both error metric values and associated encoding costs. This encoding cost aware edge selection improves progressive mesh compression by improving rate distortion.

Figure 5:
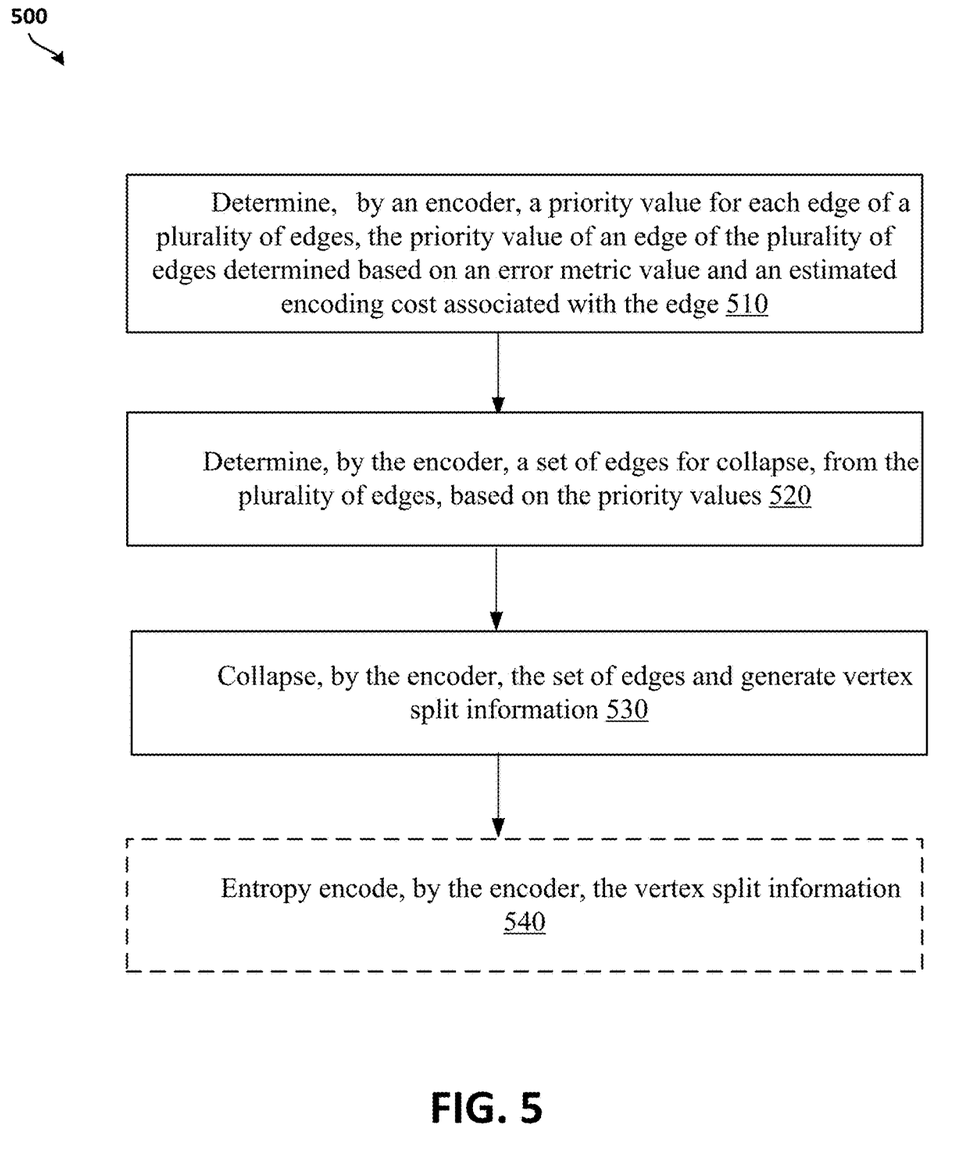
FIG. 5 illustrates a flowchart of a method of encoding cost aware edge selection, according to at least one example implementation.

FIG. 5 illustrates a flowchart 500 of a method of progressive mesh compression. In one implementation, for example, the method may be performed by an encoder and may be based on encoding cost aware edge selection.

At block 510, an encoder may determine a priority value for each edge of a plurality of edges, the priority value of an edge of the plurality of edges determined based on an error metric value and an estimated encoding cost that associated with the edge. For example, in one implementation, the encoder may determine a priority value for each edge of the plurality of the edges (of the mesh). The priority value of an edge may be determined based on the error metric value and an estimated encoding cost (e.g., residual values) associated with the collapse of the edge.

The estimated encoding cost of an edge (e.g., associated with a collapse of the edge) may be based on determined residual values associated with the edge. The residual values may be defined as a determined correction value between a predicted vertex location (e.g., 458) and an actual vertex location (e.g., 452). The residual values may be encoded and transmitted to the decoder to improve the accuracy or correctness of the decoding. Otherwise, the decoder may decode the vertex locations that are not accurate (or erroneous) resulting in a poor quality mesh.

At block 520, the encoder may determine a set of edges, from the plurality of edges, for collapse based on the priority values. For example, in one implementation, the encoder may determine the set of edges based on the priority values. The edge with the lowest error metric value and estimated encoding cost may be assigned the highest priority value and may be considered first for collapse. If the edge is not blocked (e.g., edges 302, 352), the edge may be considered eligible for collapse and added to an independent set of edges. The process of determining edges to be added to the independent set of edges continues, for example, until edges are not available. However, during the process of determining edges to be included to the independent set of edges, the encoder may determine that some edges are blocked (e.g., edges 304, 354).

At block 530, the encoder may collapse the set of edges and generate vertex split information. For example, in one implementation, the encoder may collapse the set of edges included in the independent set of edges and generate vertex split information (e.g., of a current or lower LOD). In some implementations, the encoder may collapse the set of edges included in the independent set of edges such that vertex split information is generated. The vertex split information may be used by the decoder for reconstructing the vertices and/or the edges.

The encoder may collapse the edges determined for collapse using full-edge or half-edge collapse operations. In some implementations, for generating a LOD, the encoder may use full-edge or half-edge collapse operations, probably not both type of operations in the same LOD. However, in some implementation, the encoder may use type of edge collapse operations (half-edge collapse operations) for a first LOD and another type of edge collapse operations (full-edge collapse operations) for a second LOD, and so on. This switching of edge collapse operations between LODs (or set of LODs) may reap the benefits of both half-edge and full-edge collapse operations by balancing quality (e.g., distortion) and cost (e.g., bit rate or bits per vertex).

Moreover, in some implementations, optionally, at block 540, the encoder may entropy encode the vertex split information. For example, in one implementation, the encoder may perform entropy encoding of the vertex split information to achieve better compression rates.

In some implementations, for example, the encoder may transmit the generated vertex split information to a decoder in response to a message received from the decoder. For example, in one implementation, the encoder may transmit vertex split records associated with a LOD (e.g., lowest LOD) in response to a message received from the decoder. In some other example implementations, the decoder may be requesting the highest LOD and the encoder may transmit vertex split records of all LODs, from the lowest LOD to the highest LOD, including the intermediate LODs. In other words, the encoder may starts with a highest LOD, generates a chain of LODs down to a lowest LOD along with entropy encoded vertex split information (e.g., packages) for the decoder to recover an LOD from a previous LOD and stored on a server. Upon a request from a decoder, the encoder may transmit a single rate encoded lowest LOD (e.g. using Draco mesh compression) and a sequence of entropy encoded vertex split information packages starting from the lowest LOD until the requested LOD.

Thus, the encoding cost aware edge selection improves the rate distortion of progressive mesh compression (for example, number of bits required for a certain quality).

Figure 6:
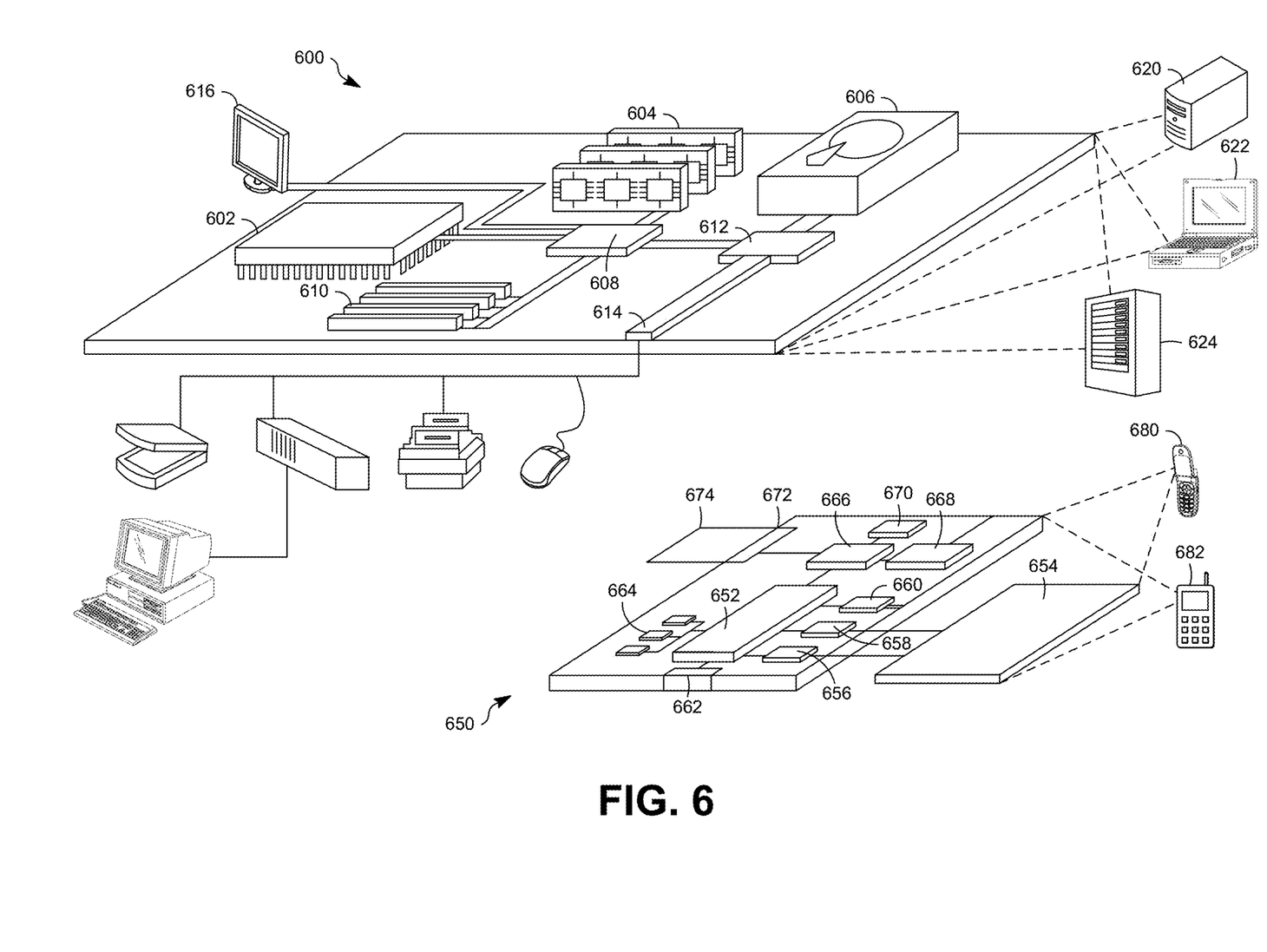
FIG. 6 illustrates an example of a computer device and a mobile computer device according to at least one example implementation.

FIG. 6 shows an example of a computer device 600 and a mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input or output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input or output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input or output device such as a display 654, a communication interface 666, and a transceiver 668, among other components. The device 650 may also be provided with a storage device, such as a microdrive or other device, to provide additional storage. Each of the components 650, 652, 564, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions, acts, or computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions or acts noted may occur out of the order noted in the figures. For example, two figures shown in succession may in fact be executed concurrently or may sometimes be executed in the reverse order, depending upon the functionality or acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

What is claimed is:

1. A computer-implemented method of progressive mesh compression, comprising:
   determining, by an encoder, a priority value for each edge of a plurality of edges, the priority value of an edge of the plurality of edges determined based on an error metric value and an estimated encoding cost based on a residual value associated with the edge;
   determining, by the encoder, a set of edges for collapse, the set of edges determined from the plurality of edges based on the priority values; and
   collapsing, by the encoder, the set of edges and generating vertex split information.

2. The method of claim 1, further comprising:
   entropy encoding, by the encoder, the vertex split information.

3. The method of claim 1, further comprising:
   transmitting, from the encoder, the generated vertex split information to a decoder in response to a message received from the decoder.

4. The method of claim 1, further comprising:
   determining, by the encoder, the error metric value associated with collapse of each edge of the plurality of edges; and
   determining, by the encoder, the estimated encoding cost associated with collapse of each edge of the plurality of edges.

5. The method of claim 1, wherein the residual values are based on a determined correction value associated with a predicted vertex location and an actual vertex location.

6. The method of claim 1, wherein the residual values are based on an estimated length of an associated residual vector.

7. The method of claim 1, wherein determining the set of edges for collapse based on the priority values further comprises:
   determining an independent set of edges for collapse based on the priority values, and each edge of the independent set of edges not blocked by other edges of the plurality of edges.

8. The method of claim 1, wherein the collapse of an edge further comprises:
   collapsing the edge using a full-edge or a half-edge collapse operation.

9. An encoder, comprising:
   a processor; and
   a memory, the memory including instructions configured to cause the processor to:
     determine a priority value for each edge of a plurality of edges, the priority value of an edge of the plurality of edges determined based on an error metric value and an estimated encoding cost based on a residual value associated with the edge;
     determine a set of edges for collapse, the set of edges determined from the plurality of edges based on the priority values; and
     collapse the set of edges and generating vertex split information.

10. The encoder of claim 9, further comprising instructions to cause the processor to:
    entropy encode the vertex split information.

11. The encoder of claim 9, further comprising instructions to cause the processor to:
    transmit the generated vertex split information to a decoder in response to a message received from the decoder.

12. The encoder of claim 9, further comprising instructions to cause the processor to:
    determine the error metric value associated with collapse of each edge of the plurality of edges; and
    determine the estimated encoding cost associated with collapse of each edge of the plurality of edges.

13. A non-transitory computer-readable storage medium having stored thereon computer executable program code which, when executed on a computer system, causes the computer system to perform a method of progressive mesh compression, comprising:
- determining, by an encoder, a priority value for each edge of a plurality of edges, the priority value of an edge of the plurality of edges determined based on an error metric value and an estimated encoding cost based on a residual value associated with the edge;
- determining, by the encoder, a set of edges for collapse, the set of edges determined from the plurality of edges based on the priority values; and
- collapsing, by the encoder, the set of edges and generating vertex split information.

14. The computer-readable storage medium of claim 13, further comprising code for:
- entropy encoding, by the encoder, the vertex split information.

15. The computer-readable storage medium of claim 13, further comprising code for:
- transmitting, from the encoder, the generated vertex split information to a decoder in response to a message received from the decoder.

16. The computer-readable storage medium of claim 13, further comprising code for:
- determining, by the encoder, the error metric value associated with collapse of each edge of the plurality of edges; and
- determining, by the encoder, the estimated encoding cost associated with collapse of each edge of the plurality of edges.

17. The computer-readable storage medium of claim 13, wherein the residual values are based on a determined correction value associated with a predicted vertex location and an actual vertex location.

* * * * *